(12) United States Patent
Post et al.

(10) Patent No.: US 9,852,412 B1
(45) Date of Patent: Dec. 26, 2017

(54) EXTENSIBLE TIMER FOR CHIP CARD COMMUNICATIONS

(71) Applicant: Square, Inc., San Francisco, CA (US)

(72) Inventors: Daniel Jeffrey Post, San Mateo, CA (US); Imran Khan, San Rafael, CA (US)

(73) Assignee: Square, Inc., San Francisco, CA (US)

( * ) Notice: Subject to any disclaimer, the term of this patent is extended or adjusted under 35 U.S.C. 154(b) by 574 days.

(21) Appl. No.: 14/472,217

(22) Filed: Aug. 28, 2014

(51) Int. Cl.
*G06Q 20/20* (2012.01)
*G06Q 20/32* (2012.01)
*G06Q 20/34* (2012.01)

(52) U.S. Cl.
CPC ......... *G06Q 20/204* (2013.01); *G06Q 20/202* (2013.01); *G06Q 20/322* (2013.01); *G06Q 20/341* (2013.01)

(58) Field of Classification Search
USPC ........................................................ 705/17
See application file for complete search history.

(56) References Cited

U.S. PATENT DOCUMENTS

| | | | |
|---|---|---|---|
| 8,875,990 B2* | 11/2014 | Bishop | G06Q 20/02 235/379 |
| 2006/0095551 A1* | 5/2006 | Leung | G06F 8/60 709/223 |
| 2011/0078081 A1* | 3/2011 | Pirzadeh | G06Q 20/20 705/44 |

* cited by examiner

*Primary Examiner* — Garcia Ade
(74) *Attorney, Agent, or Firm* — Polsinelli PC (57) ABSTRACT

A payment card reader for reading integrated circuit (IC) payment cards is disclosed. The payment card reader includes a microcontroller having non-programmable logic, coupled with a data input from the IC payment card, configured to effect a first implementation of a communication standard for communication between the microprocessor and the IC payment card, the non-programmable logic comprising a non-programmable hardware timer. The microcontroller also includes extensible logic, coupled with the data input via a general-purpose input/output (GPIO) pin, the extensible logic configured to include an extensible timer and interrupt logic, the extensible timer and interrupt logic for use with the non-programmable logic and the data input to effect a second implementation of the communication standard for communication between the microprocessor and the IC payment card.

24 Claims, 6 Drawing Sheets

EXTENSIBLE TIMER FOR CHIP CARD COMMUNICATIONS

BACKGROUND

Mobile payment systems allow individuals and merchants to accept debit and credit cards on their smartphone, tablet, or other mobile computing device. Some mobile payment systems include a payment card reader that reads and transmits payment card information to a connected mobile computing device. These payment card readers may read payment cards of various types. For example, some payment card readers may read magnetic stripes, integrated circuits, near field communication chips, or the like. In many cases, communication protocols for reading and communicating with the various types of payment cards are defined in one or more standards.

Communication protocols defined by these standards are typically implemented by device and/or component manufacturers. Therefore, many implementations of a standard may exist, and not all implementations achieve the same result. Additionally, standards can change over time, making devices and/or components designed for previous versions of the standard unusable for newer implementations. Moreover, there are often more specific standards developed that are based on a broader, general standard, making devices and components designed for the general standard incompatible with the more specific standard.

BRIEF DESCRIPTION OF THE DRAWINGS

The techniques described herein are illustrated by way of example, and not by way of limitation, in the figures of the accompanying drawings, in which like reference numerals are used to refer to similar elements.

The figures depict various embodiments of the techniques described herein for purposes of illustration only. It should be readily recognized from the following discussion that alternative embodiments of the structures and methods illustrated herein may be employed without departing from the principles of the techniques described herein.

DETAILED DESCRIPTION

Example embodiments described herein include techniques and hardware arrangements for implementing a communication standard for communicating with an integrated circuit (IC) payment card. More specifically, the techniques introduced herein allow for a payment card reader to implement an updated and/or more specific implementation (e.g., a Europay, MasterCard, and Visa (EMV)) of a general communication standard (e.g., International Organization for Standardization (ISO) 7816) using components designed to implement the general communication standard. Additionally, the techniques introduced herein allow for the payment card reader to implement a communication standard correctly when relying on a component with a design flaw that results in an incorrect implementation of the communication standard.

To implement a more specific or corrected implementation of a communication standard, the techniques introduced herein include using extensible logic configured to include an extensible timer and interrupt logic to increase waiting times defined by the general communication standard or implemented by a component manufacturer. The component may implement the general communication standard using non-programmable logic and/or hardware and the extensible logic is configured with an extensible timer to extend the waiting time when a hardware timer implemented by the non-programmable logic of the component expires. Further, the extensible logic includes interrupts to indicate when a character of data is received within the extended waiting time so that an error signal is not falsely triggered. The extensible logic monitors a data input/output of the component and asserts the interrupt when a character of data is detected. The interrupt notifies the extensible logic that a valid communication has occurred and that the error signal should not be asserted.

Figure 1:
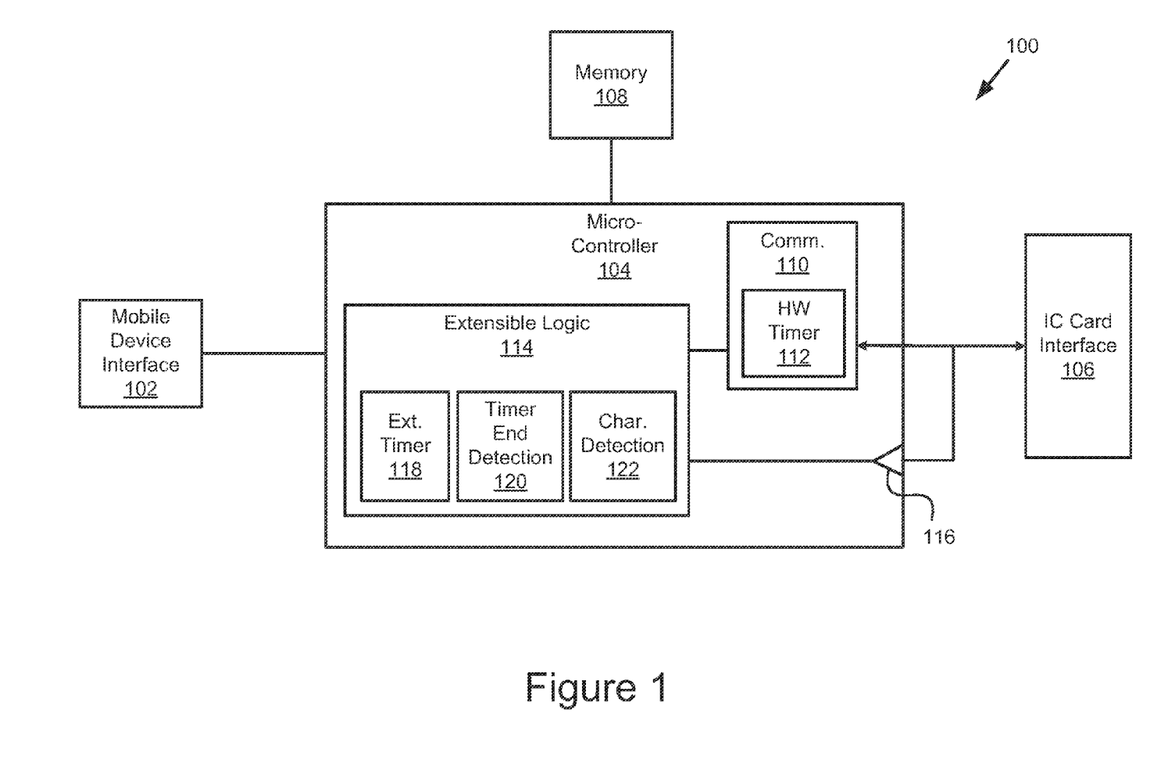
FIG. 1 illustrates a block diagram of an example payment card reader for communicating with an integrated circuit (IC) payment card.

FIG. 1 illustrates a block diagram of an example payment card reader 100 for communicating with an integrated circuit (IC) payment card. The payment card reader 100 includes a microcontroller 104, an IC card interface 106, and a memory 108. The card reader 100 also includes a mobile device interface 102 to couple the payment card reader 100 with a mobile computing device (not shown). In one embodiment, the mobile device interface 102 may include a tip-ring-ring-sleeve (TRRS) connector to couple the payment card reader 100 with an audio port of a mobile computing device and use the audio port as a communication medium. In other embodiments, the mobile device interface may include other physical connectors, standardized or proprietary, for coupling the payment card reader 100 with the mobile computing device. In yet other embodiments, the mobile device interface 102 may include a low power wireless communication interface (e.g., Bluetooth, Bluetooth Low Energy, Zigbee, or the like) to communicatively couple the payment card reader with the mobile computing device without a physical connection.

The microcontroller 104 may be configured to control the overall operation of the payment card reader 100 and to process payment card data read from an IC payment card using the IC card interface 106. Processing payment card data may include, for example, encrypting the payment card data and/or encoding the payment card data for transmission to the mobile computing device. The microcontroller 104 may execute instructions by performing various input/output, logical, and/or mathematical operations. The microcontroller 104 may itself comprise one or more processors or processing cores. For example, the microcontroller 104 can be implemented as one or more microprocessors, microcomputers, digital signal processors, central processing units, state machines, logic circuits, and/or any devices that manipulate signals based on operational instructions. In some embodiments, the microcontroller 104 may be one or more hardware processors and/or logic circuits of any suitable type specifically programmed or configured to execute algorithms and processes to process and transmit payment card data.

The microcontroller includes communication circuitry 110 for communicating with an IC payment card via the IC card interface 106. In one embodiment, the communication circuitry implements a specialized serial communication protocol for communication with the IC card interface 106. For example, the communication circuitry may implement a Universal Asynchronous Receiver/Transmitter (UART) that operates according to a version of the ISO 7816 standard. It will be apparent that the communication circuitry may implement other communication schemes and standards, such as Universal Synchronous/Asynchronous Receiver/Transmitter (USART), Serial Peripheral Interfaces (SPI), Inter-Integrated Circuit (I2C), or the like.

In the example where the communication circuitry 110 implements an ISO 7816 UART, the hardware timer 112 may be used to count waiting times defined by the version of the ISO 7816 standard implemented, such as a Block Waiting Time (BWT), a Character Waiting Time (CWT), and a Work Waiting Time (WWT). These waiting times define the maximum interval between the leading edge of the start bits of consecutive characters communicated between the IC payment card and the payment card reader 100. The communication circuitry 110 includes logic to determine the length of BWT, CWT, and WWT using information communicated in an initial communication message from an IC payment card when it is placed in the IC card interface 106.

In response to the hardware timer 112 expiring, an interrupt is triggered to indicate to the communication circuitry 110 that communication between the payment card and the payment card reader 100 has timed out. In one embodiment, the interrupt may include flags that indicate a time-out error and a communication protocol that is being used for communication between the payment card and the payment card reader 100. The communication circuitry 110, in response to detecting the interrupt, terminates the communication and initiates a deactivation sequence of the card reader 100.

However, as introduced above, there may be circumstances where the length of BWT, CWT, and WWT calculated by the communication circuitry 110 is not suitable for a particular IC payment card communication protocol. For example, BWT, CWT, and WWT as defined by a version of the EMV communication standard may be slightly longer than those defined by the a particular version of the ISO 7816 standard and implementing the version of the EMV standard payment card reader with the ISO 7816 UART circuitry may result in poor performance or non-compliance with the version of the EMV standard. Additionally, the ISO 7816, or other, communication standard may change over time, making older microcontrollers unreliable or non-compliant with the current standard. Further, manufacturing and/or design defects may cause the communication circuitry to implement a communication protocol with waiting times that are not compliant with the intended standard. Any one of these issues, or a combination thereof, may be present when a particular microcontroller (e.g., microcontroller 104) is selected for use in a payment card reader 100.

To overcome these challenges, such that the payment card reader 100 complies with a particular communication standard, the techniques introduced herein use extensible logic 114 to adjust the length of the waiting times to be compliant with the intended communication standard. In one embodiment, the extensible logic 114 may be configured to extend the waiting time when the hardware timer 112 expires. This may be useful, for example, when the hardware implementation of the waiting time is shorter than that defined by the intended standard. In another embodiment, the extensible logic 114 may be configured to run for the entire waiting time and bypass the hardware timer 112 to be compliant with the intended communication standard. This may be useful, for example, when the hardware implementation of the waiting time is either longer or shorter than the waiting time defined by the intended communication standard.

To implement the techniques introduced herein, the extensible logic 114 is coupled with the communication circuitry 110 and a General Purpose Input/Output (GPIO) 116 of the microcontroller 104. The extensible logic 114 includes an extensible timer 118, a timer end detection module 120, and a character detection module 122. If, as discussed above, the hardware implementation of the waiting time is shorter than that defined by the intended standard, the timer end detection module 120 of the extensible logic 114 detects when the hardware timer 112 ends. For example, the timer end detection module 120 may be configured to listen for an interrupt from the hardware timer 112 indicating a time-out error when the hardware timer 112 expires and the communication circuitry 110 has not detected the next character. In response to detecting that the hardware timer 112 has expired, the timer end detection module 120 may send a signal to start the extensible timer 118. Additionally, the extensible logic 114 may intercept the interrupt triggered when the hardware timer expires, thereby preventing the communication circuitry 110 from terminating the communication and initiating the deactivation sequence of the card reader 100 prematurely.

If the communication circuitry 110 detects the leading edge of the start bit of the next character communicated between the IC payment card and the payment card reader 100 while the hardware timer 112 is counting the waiting time, the communication circuitry 110 resets the hardware timer 112 to begin counting the next waiting time. To emulate this behavior when the next character is communicated between the IC payment card and the payment card reader 100 while the extensible timer 118 is counting the extended waiting time, the extensible logic 114 includes a character detection module 122 coupled with the GPIO 116 to detect the leading edge of the first bit of the next character. In response to detecting the next character, the extensible logic 114 may be configured, in one embodiment, to cancel the extensible timer 118. In another embodiment, the extensible logic 114, in response to detecting the next character, may set a flag that indicates a valid communication and to ignore an error interrupt triggered when the extensible timer 118 expires.

If, as discussed above, the extensible logic 114 is configured to run the entire waiting time, the timing functions of the communication circuitry 110 may be replaced using the extensible timer 118 and character detection module 122. Similar to the example above, the extensible timer 118 would begin when the character detection module 122 detects the leading edge of the start bit of a character communicated between the IC payment card and the payment card reader 100. In response to detecting the next character, the character detection module 122 may send an interrupt that instructs the extensible timer 118 to reset and begin counting again. If the extensible timer expires before the character detection module 122 detects the next character, the extensible logic 114 sends an interrupt indicating a time-out error and the payment card reader 100 aborts the communication. However, using the extensible logic 114 to replace the functionality of communication circuitry 110 in some cases may be computationally expensive and result in poor performance and/or high power consumption by the payment card reader 100.

In some embodiments, the extensible logic 114 is implemented as software and/or instructions stored in on-chip memory (not shown) of microcontroller 104. In other embodiments, extensible logic 114 may be implemented as software stored on memory external to the microcontroller 104 (e.g., memory 108). In any case, the software and/or instructions may be executable by microcontroller 104 to implement the techniques introduced herein.

The memory 108 may be, or include, one or more physical storage devices, which may be in the form of random access memory (RAM), read-only memory (ROM) (which may be erasable and programmable), flash memory, or other suitable type of storage device, or a combination of such devices. Instructions, executed by the microcontroller 104, for operating the payment card reader 100 may be stored as software and/or firmware in the memory 108.

The card interface 106 may be a conventional EMV chip interface, or other suitable type of IC card interface. For example, the card interface 106 may include a payment card slot having components configured as a dip-slot to facilitate reading of an IC payment card (e.g., a payment card that conforms to the EMV global standard). Similarly, the card interface 106 may include a payment card slot having a read head configured to receive a magnetic stripe payment card and to facilitate reading of the magnetic stripe payment card. In some embodiments, the card interface 106 may be configured to read both a magnetic stripe payment card and an IC payment card.

Figure 2A:
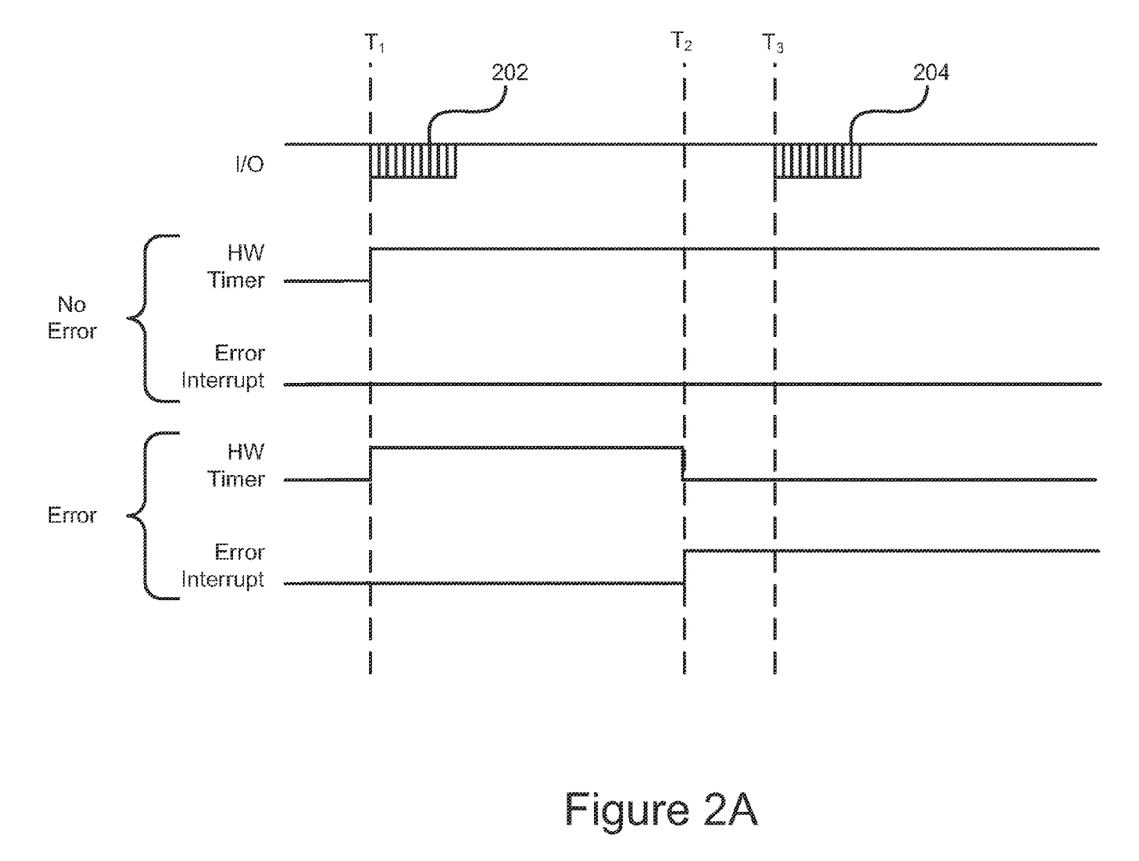
FIGS. 2A and 2B illustrate example timing diagrams for communications between an IC payment card and a payment card reader.
Figure 2B:
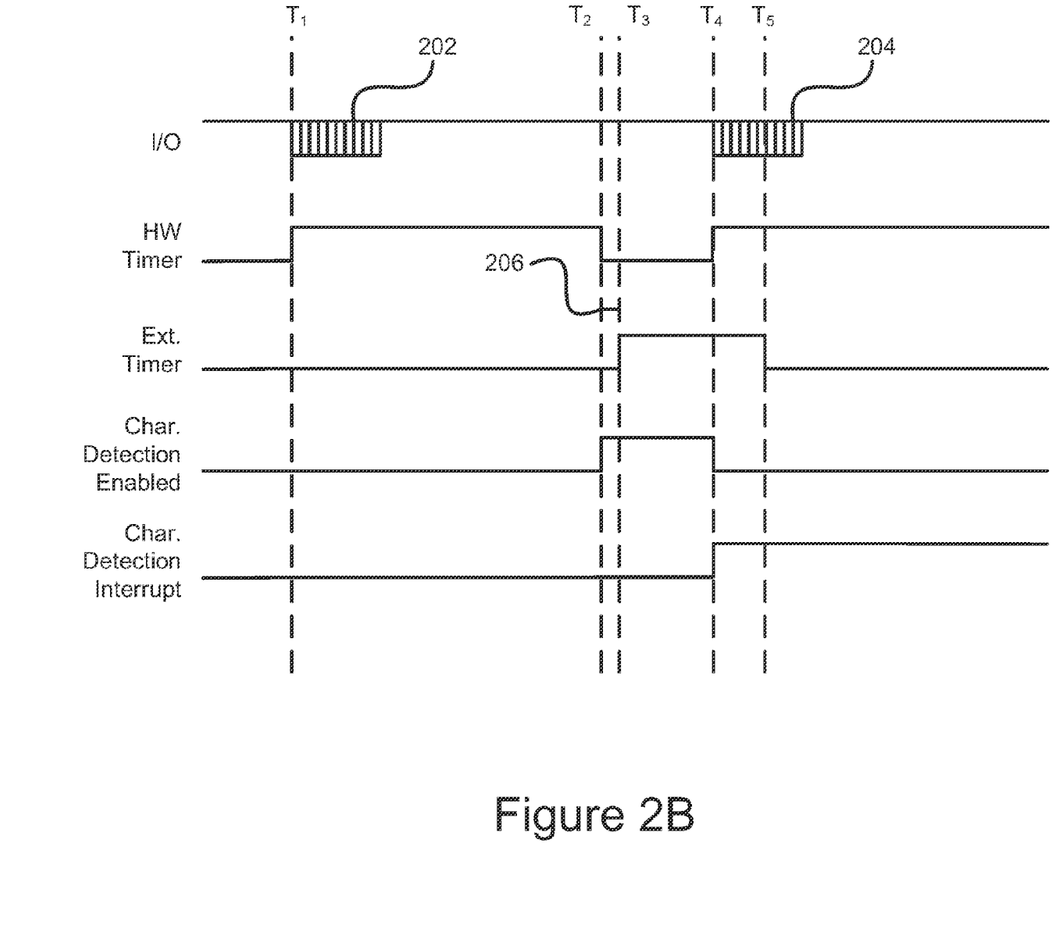

The following timing diagrams illustrate example communications between an IC payment card and a payment card reader, such as payment card reader 100, operating according to a version of the EMV global standard. Communications between the IC payment card and the payment card reader may take place according to two types of asynchronous communication protocols, a character-oriented protocol (also referenced herein as character protocol) and a block-oriented protocol (also referenced herein as block protocol). The character protocol is an asynchronous communication protocol where an acknowledgment is communicated for each byte of data that is sent. The block protocol is also an asynchronous communication protocol, however in the block protocol a number of bytes of data can be sent prior to receiving an acknowledgment. The protocol to be used in the communication is indicated by the IC payment card in the initial communication message.

Both the character protocol and the block protocol use character frames to transmit data bytes between the IC payment card and the payment card reader. A character, according to the EMV global standard, consists of ten consecutive bits: one start bit, eight data bits (a byte of data), and a parity checking bit. The EMV global standard defines maximum waiting times to receive the next character in both the character and block protocols. If the next character is not detected by the end of the maximum waiting time, a time-out error is indicated and the communication is canceled. As described above, the EMV standard includes three waiting times, BWT, CWT, and WWT. WWT is used for character protocol communications, and is the maximum interval between the leading edge of the start bit of any character sent by the IC payment card and the leading edge of the start bit of the previous character sent by either the IC payment card or the payment card reader. BWT and CWT are used for block protocol communications. BWT is the maximum interval between the leading edge of the start bit of the last character sent from the payment card reader to the IC payment card, after which the payment card reader is expecting a response, and the leading edge of the start bit of the response from the IC payment card. CWT is the maximum interval between the leading edges of the start bits of two consecutive characters sent in the same block from the IC payment card.

FIG. 2A illustrates an example timing diagram for communications between an IC payment card and a payment card reader. The example timing diagram of FIG. 2A illustrates two timing conditions, a no error condition and an error condition, where the intended communication standard is implemented correctly. In the example of FIG. 2A, the hardware timer is depicted as counting the waiting time when the signal is high and stopped when the signal is low. However, in various implementations, the state of the timer may be tracked in different ways, for example as bits in a register where the high and low states depicted in FIG. 2A are different register values. In the no error condition, at time $T_1$ the communication circuitry 110 detects the leading edge of the first bit of character 202 and the hardware timer begins counting a waiting time, as depicted in the example of FIG. 2A by the hardware timer transitioning from low to high. This waiting time may be, for example, BWT, CWT, or WWT. At time $T_3$, the communication circuitry 110 detects the leading edge of the first bit of character 204 prior to the hardware timer expiring (i.e., transitioning from high to low in the example of FIG. 2A). The communication circuitry 110, at time $T_3$, resets the hardware timer to count the waiting time for the next anticipated character. In the example of FIG. 2A, the hardware timer reset is depicted at time $T_3$ where the state remains unchanged. However, in one embodiment, the state of the hardware timer may transition when the hardware timer is reset. For example, the register value associated with the hardware timer may transition from one value to another instead of remaining constant as depicted in the example of FIG. 2A.

In the error condition, at time $T_1$ the communication circuitry 110 detects the leading edge of the first bit of character 202 and the hardware timer begins counting a waiting time. However, in the error condition example, the hardware timer expires at time $T_2$ prior to the arrival of the first bit of character 204 at time $T_3$. In response to detecting the expiration of the hardware timer, the communication circuitry 110 sends an interrupt indicating a time-out error. The example of FIG. 2A is used to show operation of communication circuitry of a microcontroller implementing a particular communication standard. However, as discussed above, there may be circumstances where the hardware implementation of the particular communication standard is out of date, not correctly implemented, or too general. If this is the case, an error condition may be indicated for a communication that would be considered valid had the communication standard than implemented correctly.

In the situation described above, where the hardware implementation of the communication standard results in an incorrect waiting time, the techniques introduced herein provide the correct waiting time using an extensible timer as described above with reference to FIG. 1. FIG. 2B illustrates another example timing diagram for communications between an IC payment card and a payment card reader according to the techniques introduced herein. At time $T_1$ the communication circuitry 110 detects the leading edge of the first bit of character 202 and the hardware timer begins counting a waiting time. As above, this waiting time may be, for example, BWT, CWT, or WWT depending on whether the communication is block protocol or character protocol and whether character 202 was sent by the payment card reader or the IC payment card.

At time $T_2$ the hardware timer 112 expires prior to the entire waiting time according to the desired implementation of the communication standard. As introduced above, the extensible logic 114 may intercept the interrupt triggered when the hardware timer expires, thereby preventing the communication circuitry 110 from terminating the communication and initiating the deactivation sequence of the card reader 100. In addition, the extensible logic 114 starts the extensible timer 118 to run an additional time such that the total time of the hardware timer 112 and the extensible timer 118 is the proper waiting time.

In one embodiment, the timer end detection module 120 detects the end of the hardware timer 112 and sends a signal to start the extensible timer 118. However, there may be a small amount of time 206 between the end of the hardware timer 112 at time $T_2$ and the start of extensible timer 118 at time $T_3$. The small amount of time 206 may be due to the clock cycles during which the microcontroller 104 processes the detection of the expiration of the hardware timer 112 and starts the extensible timer 118. If the character detection module 122, which is monitoring the communication between the IC card interface 106 and the communication circuitry 110 through the GPIO 116, started listening for the next character at time $T_3$, when the extensible timer 118 begins, there is a chance that the next character may arrive during the time 206 and the character detection module 122 would miss the leading edge of the first bit of the next character. This would result in an incorrect error condition being indicated.

To make sure that the leading edge of the first bit of the next character is not missed during the time 206, the extensible logic 114 enables the character detection module 122 at time $T_2$ when the timer end detection module 120 detects the end of the hardware timer 112. At time $T_4$, the character detection module 120 detects the leading edge of the first bit of character 204 on GPIO 116 prior to the extensible timer 118 expiring at time $T_5$. In response to detecting the character 204, the character detection module 122 sends an interrupt indicating that the next character 204 has been detected and canceling the extensible timer 118. The character detection enablement and the character detection interrupt may be implemented, for example, as a bit flag in a register created by the extensible logic 114. In one embodiment, instead of canceling the extensible timer, the interrupt may set a flag that the extensible logic 114 checks on expiration of the extensible timer 118, at time $T_5$, to determine whether the next character has been received. If the flag is set when the extensible timer expires, a time-out error is not indicated. Also, at time $T_4$, the hardware timer 112 begins to count the waiting time for the next anticipated character in response to detecting the leading edge of the first bit of the character 204 and the process repeats.

Figure 3:
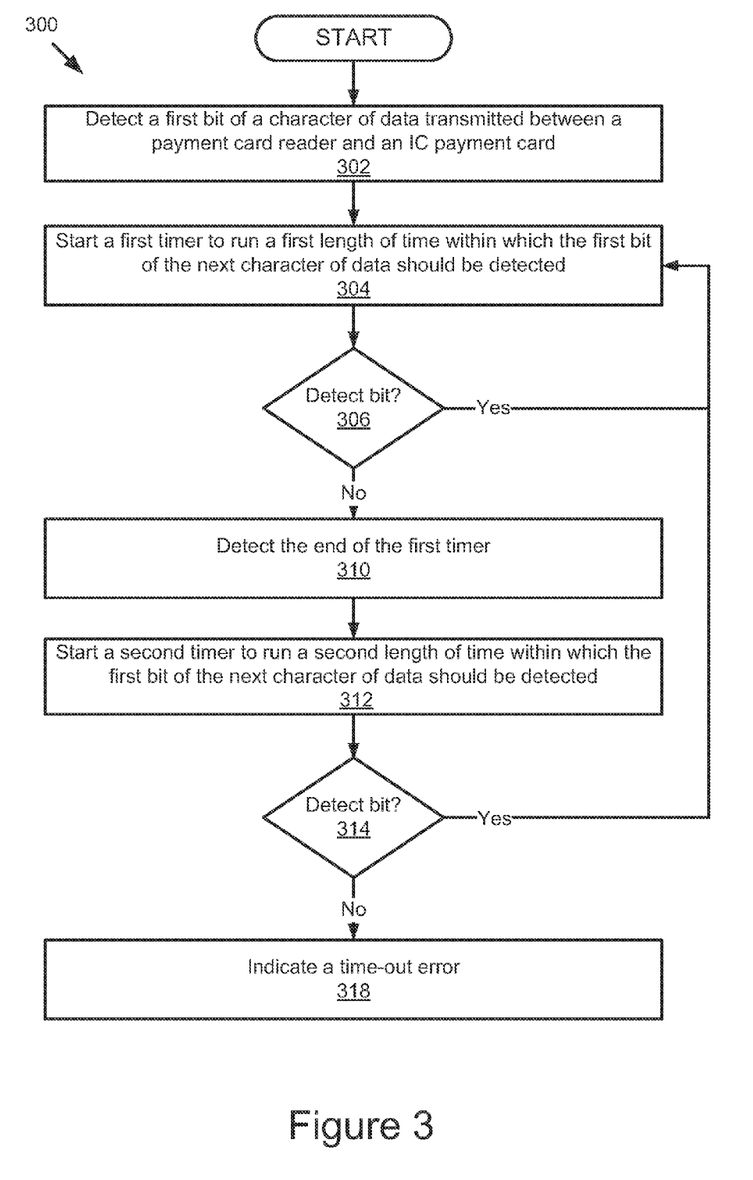
FIG. 3 is a flow diagram of an example process for communications between an IC payment card and a payment card reader.

FIG. 3 is a flow diagram of an example process for communications between an IC payment card and a payment card reader. The process 300 described in the example of FIG. 3 is illustrated as a collection of blocks in a logical flow diagram, which represent a sequence of operations, some or all of which can be implemented in hardware, software, or a combination thereof. The order in which the blocks are described should not be construed as a limitation. Any number of the described blocks can be combined in any order and/or in parallel to implement the process, or alternative processes, and not all of the blocks need be executed. For ease of description, the process is described with reference to the environments, architectures and systems described in the examples herein, although the process may be implemented in a wide variety of other environments, architectures and systems.

At 302, the communication circuitry 110 of the microcontroller 104 detects the leading edge of the first bit of a character of data transmitted between the payment card reader 100 and an IC payment card. In one embodiment, the payment card reader 100 sends the character of data transmitted between the payment card reader 100 and the IC payment card. In another embodiment, the payment card reader detects the character of data sent to the payment card reader 100 by the IC payment card.

At 304, the communication circuitry 110 starts a first timer to run a first length of time, within which the first bit of the next character of data should be detected. In one embodiment, the first length of a time is a waiting time determined by communication circuitry 110 hardware. For example, the designer of the microcontroller 104 may include calculation of waiting times for communication between the payment card reader 100 and an IC payment card in the non-programmable logic of the communication circuitry 110. As described above, the waiting time may be a CWT, a BWT, or a WWT depending on the direction of the first character of data and whether the communication is a block protocol or a character protocol communication.

At 306, the communication circuitry 110 listens for the first bit of the next character of data from the IC payment card. If the communication circuitry 110 detects the first bit of the next character of data, the first timer starts over, at 304, and the communication circuitry again listens for the first bit of the next character of data. However, if the communication circuitry does not detect the first bit of the next character and the extensible logic 114 detects the end of the first timer, at 310, the extensible logic starts a second timer, at 312, to run a second length of time within which the first bit of the next character of data should be detected.

As described above, the second timer may be used to implement a waiting time according to a more specific, updated, or corrected version of the communication standard implemented by the communication circuitry 110. For example, the hardware implementation of the communication standard embodied in the communication circuitry 110 may be a version of the ISO 7816 communication standard and the desired implementation of the communication standard may be a version of the EMV global standard which allows for a longer waiting time. Additionally, the hardware implementation of the version of the ISO 7816 communication standard may include errors such that the waiting times calculated by the communication circuitry 110 are incorrect. Further, the communication circuitry 110 may implement an outdated version of the communication standard and the desired version of the communication standard may include updated waiting times. The second timer may be used to correct all of these flaws by extending the waiting time using the extensible logic 114 including the extensible timer 118.

At 314, the character detection module 120, implemented by the extensible logic 114, listens for the first bit of the next character of data sent from the IC payment card. If the character detection module 120 detects the first bit of the next character of data, the second timer is canceled and the first timer is reset, at 304, and the communication circuitry again listens for the first bit of the next character of data. However, if the character detection module 120 does not detect the first bit of the next character and the extensible logic 114 detects the end of the second timer, the extensible logic 114 indicates a time-out error, at 318. In response to the time-out error, the payment card reader 100 terminates communication with the IC payment card.

Figure 4:
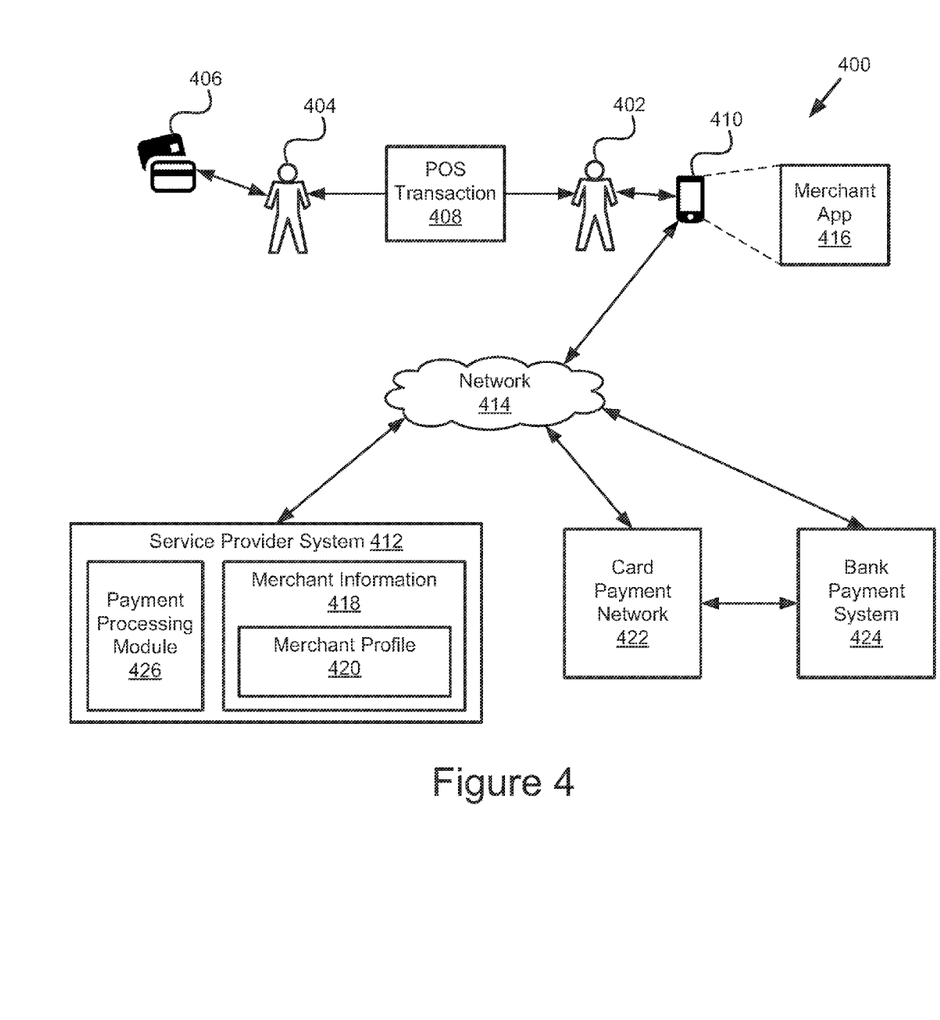
FIG. 4 illustrates an example architecture of a payment communication system for enabling transactions between merchants and buyers.

FIG. 4 illustrates an example architecture of a payment communication system 400 for enabling transactions between merchants 402 and buyers 404. In the example of FIG. 4, a buyer 404 may use any of a variety of payment cards 406 when participating in a POS transaction 408 with a merchant 402. For example, a buyer 404 may typically have payment cards 406 such as credit cards, debit cards, prepaid cards, and the like, that the buyer 404 may use for conducting POS transaction 408. In some embodiments, the payment cards 408 may include one or more magnetic stripes for providing payment card and buyer information when swiped in a card reader 100. In other embodiments, other types of payment cards may be used, for example smart cards having a built in integrated circuit including a memory chip, a radio frequency identification tag, and the like.

The payment communication system 400 in the example of FIG. 4 illustrates a merchant device 410 associated with the merchant 402 that participates in the payment service provided by the service provider. As discussed elsewhere herein, the merchant device 410 may be a computing device (e.g., a mobile computing device) able to communicate with the service provider system 412, and with various other computing devices, through any suitable communication protocols, interfaces, and networks, including network 414. Further, the merchant device 410 may be any appropriate device operable to send and receive requests, messages, or other types of information over the network 414. Additionally, while only a single merchant device 410 is illustrated in the example of FIG. 4, in some implementations there may be additional merchant devices depending on the number of merchants participating in the payment service.

Each merchant device 410 may include an instance of a merchant application 416 executed on the merchant device. The merchant application 416 may provide POS functionality to enable the merchant 402 to accept payments at a POS location using the merchant device 410. In some types of businesses, the POS location may correspond to a store or other place of business of the merchant, and thus, may be a fixed location that typically does not change on a day-to-day basis. In other types of businesses, however, the POS location may change from time to time, such as in the case that the merchant 402 operates a food truck, is a street vendor, a cab driver, or has an otherwise mobile business, e.g., in the case of merchants who sell items at buyers' homes, buyers' places of business, and so forth.

Accordingly, the merchant 402 and the buyer 404 may conduct a POS transaction 408 by which the buyer 404 acquires an item or service from the merchant 402 at a POS location. The merchant application 416 on the merchant device 410 may send transaction information to the service provider system 412, e.g., as the transaction is being conducted at the POS location. In some embodiments, such as if a particular merchant device 410 is not connected to the network 414 and is therefore processing transactions offline, the transaction information may be sent in a batch at a subsequent point in time or using other suitable techniques.

The transaction information may include information regarding the time, place, and the amount of each respective transaction, information related to the item acquired, payment card information, as well as additional information, such as buyer information. For instance, the transaction information can include data stored in the payment card, e.g., magnetic stripe or integrated circuit data (cardholder name, card number, and other card information). In addition, when completing the transaction a buyer may sometimes provide a receipt email address for receiving a receipt through email. Other examples of transaction information that can be captured include detailed item information, e.g., an itemized listing of the items or services being acquired, the price being paid for each item or service, descriptors of the items or services (e.g., size, flavor, color, etc.), geolocation data indicating a geographic POS location of a particular transaction, online/offline card data, data describing the merchant, e.g., a merchant identifier, a merchant category code (MCC), any type of data that is received upon a buyer's authentication into a social network, if any, and various other types of information.

To accept electronic payments for POS transactions, the merchant 402 typically creates a merchant account on the service provider system 412 by providing information describing the merchant including, for example, merchant name, contact information (e.g., telephone numbers, the merchant's address, and one or more financial accounts to which funds collected from buyers will be deposited). This merchant information can be securely stored by the service provider, for example, as merchant information 418 in a secure database. Further, the merchant information may include a merchant profile 420 created for each merchant. The merchant profile 420 may include information about the merchant 402 and transaction information associated with transactions conducted by the merchant.

The service provider system 412 enables a service provider to provide a payment service in which merchants 402 are able to conduct POS transactions 408 with a plurality of buyers 402, such as for selling services and/or produces to the buyers 402. The service provider system 412 may include one or more servers that are configured to process secure electronic financial transactions, e.g., payment during a POS transaction 408, by communicating with the merchant device 410, card payment networks 422, and bank or other financial institution payment systems 424. The service provider system 412 includes a payment processing module 426 that receives transaction information for processing payments made through the merchant application 416. For example, the payment processing module 426 may receive transaction information, such as an amount of the transaction, and may verify that a particular payment card 406 can be used to pay for the transaction, such as by contacting a card clearinghouse of a card payment network 422. Furthermore, in some examples, the payment processing module 426 may redirect payment information for transactions to be made using payment cards 406 to a bank, or other financial institution, payment system 424. In other embodiments, the merchant device 410 may communicate directly with an appropriate card payment network 422 or bank payment system 424 for approving or denying a transaction using a particular payment card 406 for a POS transaction 408. Additional details of payment processing are discussed below.

As introduced above, the service provider system 426 may be configured to communicate with one or more systems of a card payment network 422 (e.g., MasterCard®, VISA®, or the like) over the network 414 to conduct financial transactions electronically. The service provider system 426 may also communicate with one or more bank systems 424 of one or more banks over the network 414. For example, the service provider system may communicate with an acquiring bank, a payment card issuing bank, and/or a bank maintaining buyer accounts for electronic payments.

A payment card acquiring bank may be a registered member of a card association (e.g., Visa®, MasterCard®, or the like), and may be part of a card payment network 422. A payment card issuing bank may issue payment cards 406 to buyers 402, and may pay acquiring banks for purchases made by cardholders to which the issuing bank has issued a payment card 406. Accordingly, in some embodiments, the systems of an acquiring bank may be included in the card payment network 422 and may communicate with systems of a payment card issuing bank to obtain payment. Further, in some embodiments, bank payment systems 424 may include systems associated with debit card issuing institutions, in which case, the systems of the debit card issuing institution may receive communications regarding a transaction in which the buyer uses a debit card instead of a credit card. Additionally, there may be systems of other financial institutions involved in some types of transactions or in alternative system architectures, and thus, the foregoing are merely several examples.

The network 414 can be a conventional type, wired or wireless, and may have numerous different configurations including a star configuration, token ring configuration, or other configurations. Furthermore, the network 414 may include a local area network (LAN), a wide area network (WAN) (e.g., the Internet), and/or other interconnected data paths across which multiple devices may communicate. In some embodiments, the network 414 may be a peer-to-peer network. The network 414 may also be coupled with or include portions of a telecommunications network for sending data using a variety of different communication protocols. In some embodiments, the network 414 may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 4 illustrates one network 414 coupled to the merchant device, service provider system, card payment network, and bank, in practice one or more networks 414 can connect these entities.

Figure 5:
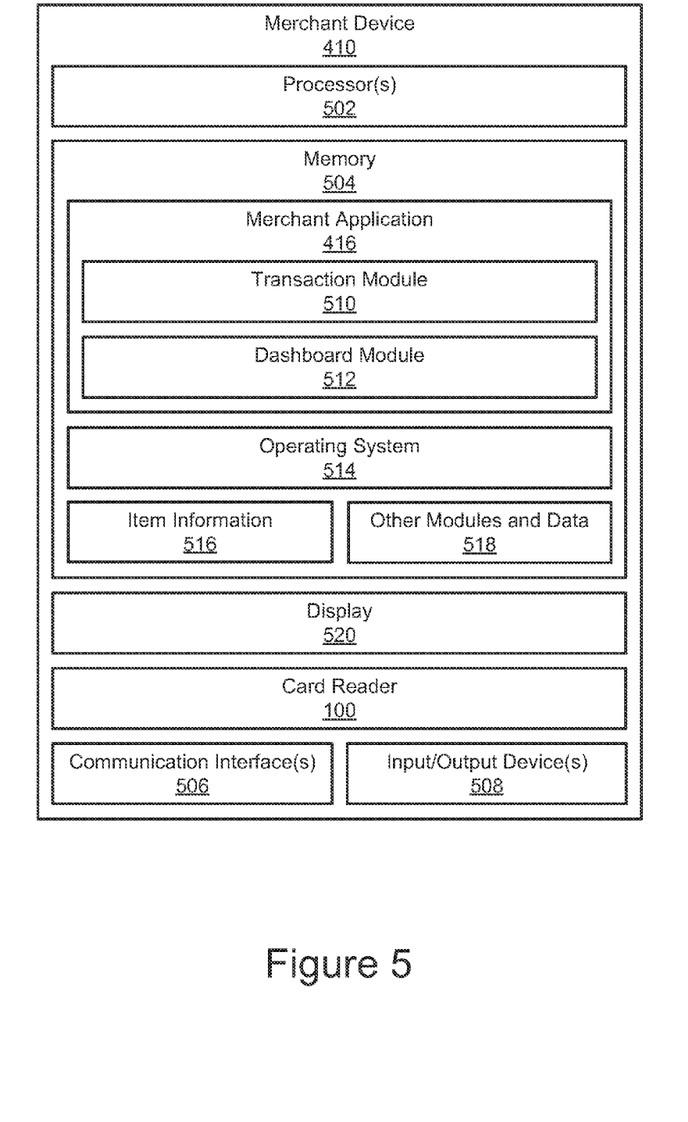
FIG. 5 illustrates an example block diagram of components of a merchant device.

FIG. 5 is a block diagram of components of an example merchant device 410 according to some embodiments. The merchant device 410 may be any suitable type of computing device, e.g., portable, semi-portable, semi-stationary, or stationary. Some examples of the merchant device 410 may include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other bodymounted computing devices; augmented reality devices; or other computing devices capable of sending communications and performing the functions according to the techniques described herein.

In the example of FIG. 5, the merchant device 410 includes at least one processor 502, a memory 504, one or more communication interfaces 506, and one or more input/output (I/O) devices 508. Each processor 502 may itself comprise one or more processors or processing cores. For example, the processor 502 can be implemented as one or more microprocessors, microcomputers, microcontrollers, digital signal processors, central processing units, state machines, logic circuitries, and/or any devices that manipulate signals based on operational instructions. In some embodiments, the processor 502 may be one or more hardware processors and/or logic circuits of any suitable type specifically programmed or configured to execute the algorithms and processes described herein by performing various input/output, logical, and/or mathematical operations. The processor 502 can be configured to fetch and execute computer-readable processor-executable instructions stored in the memory 504.

Depending on the configuration of the merchant device 410, the memory 504 may be an example of tangible non-transitory computer storage media and may include volatile and nonvolatile memory and/or removable and non-removable media implemented in any type of technology for storage of information such as computer-readable processor-executable instructions, data structures, program modules or other data. The computer-readable media 504 may include, but is not limited to, RAM, ROM, EEPROM, flash memory, solid-state storage, magnetic disk storage, optical storage, and/or other computer-readable media technology. Further, in some cases, the merchant device 410 may access external storage, such as RAID storage systems, storage arrays, network attached storage, storage area networks, cloud storage, or any other medium that can be used to store information and that can be accessed by the processor 502 directly or through another computing device or network. Accordingly, the memory 504 may be computer storage media able to store instructions, modules or components that may be executed by the processor 502.

The memory 504 may be used to store and maintain any number of functional components or modules that are executable by the processor 504. In some embodiments, these functional components comprise instructions or programs that are executable by the processor 502 and that, when executed, implement operational logic for performing the actions and services attributed above to the merchant device 410. Functional components of the merchant device 410 stored in the memory 504 may include the merchant application 416. In this example, the merchant application 416 includes a transaction module 510 and a dashboard module 512. For example, the transaction module 510 may present an interface, such as a payment interface to enable the merchant to conduct transactions, receive payments, and so forth, as well as for communicating with the service provider system 412 for processing payments and sending transaction information. The dashboard module 512 may further enable the merchant to manage the merchant's account, the merchant profile, merchant preferences, view saved or new pricing information, and the like. Additional functional components may include an operating system 514 for controlling and managing various functions of the merchant device 410 and for enabling basic user interactions with the merchant device 410.

In addition, the memory 504 may also store data, data structures and the like, that are used by the functional components. For example, data stored by the computer-readable media 504 may include item information 516 that includes information about the items offered by the merchant, which may include a list of items currently available from the merchant, images of the items, descriptions of the items, prices of the items, and so forth. For instance, when the merchant 402 is setting up the merchant application 416 to accept payments for particular items offered by the merchant 402, the merchant may enter the item information 516 for the particular items. Depending on the type of the merchant device 410, the computer-readable media 504 may also optionally include other functional components and data, such as other modules and data 518, which may include programs, drivers, etc., and the data used or generated by the functional components. Further, the merchant device 410 may include many other logical, programmatic and physical components, of which those described are merely examples that are related to the discussion herein.

The communication interface(s) 506 may include one or more interfaces and hardware components for enabling communication with various other devices, such as over the network(s) 414 or directly. For example, communication interface(s) 506 may enable communication through one or more of the Internet, cable networks, wireless networks (e.g., Wi-Fi) and wired networks, as well as close-range communications such as Bluetooth®, Bluetooth® low energy, and the like, as additionally enumerated elsewhere herein.

In another embodiment, the communication interface(s) 506 may include a cellular communications transceiver for sending and receiving data over a cellular communications network such as via short messaging service (SMS), multimedia messaging service (MMS), hypertext transfer protocol (HTTP), direct data connection, WAP, e-mail or another suitable type of electronic communication. The communication interface(s) 506 also provides other conventional connections to the network 206 for distribution of files and/or media objects using standard network protocols such as TCP/IP, HTTP, HTTPS and SMTP as will be understood.

The merchant device 410 may further include a display 520, which may employ any suitable display technology. For example, the display 520 may be a liquid crystal display, a plasma display, a light emitting diode display, an OLED (organic light-emitting diode) display, an electronic paper display, or any other suitable type of display able to present digital content thereon. In some embodiments, the display 520 may have a touch sensor associated with the display 520 to provide a touchscreen display configured to receive touch inputs for enabling interaction with a graphical user interface presented on the display 520. Accordingly, embodiments described herein are not limited to any particular display technology. Alternatively, in some embodiments, the merchant device 410 may not include the display 520, and information may be presented by other means, such as aurally.

The merchant device 410 may further include the one or more I/O devices 508. The I/O devices 508 may include speakers, a microphone, a camera, and various user controls (e.g., buttons, a joystick, a keyboard, a keypad, etc.), a haptic output device, and so forth.

In addition, the merchant device 410 may include or may be connectable to a payment card reader 100. In some embodiments, the payment card reader 100 may plug in to a port in the merchant device, such as a microphone/headphone port (as described above), a data port, or other suitable port. The payment card reader 100 may include a card interface for reading a magnetic stripe or an integrated circuit of a payment card 406, and further may include encryption technology for encrypting the information read from the payment card 406. Alternatively, numerous other types of payment card readers 100 may be employed with the merchant devices 410 herein, depending on the type and configuration of the merchant device 410.

As used here, the term "payment card" refers to a payment mechanism which includes a debit card, a conventional credit card, "smartcards" that have embedded integrated circuit chips (e.g., Europay-MasterCard-Visa (EMV) cards), or any wallet-size card which functions as a combination of any of these payment mechanisms.

Other components included in the merchant device 410 may include various types of sensors (not shown), which may include a GPS device, an accelerometer, gyroscope, compass, proximity sensor, and the like. Additionally, the merchant device 410 may include various other components that are not shown, examples of which include removable storage, a power source, such as a battery and power control unit, and so forth.

A payment card reader including an energy harvesting bidirectional audio interface has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the techniques may be implemented using any type of computing system that can receive data and commands, and present information as part of any peripheral device providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the techniques to the precise form disclosed. Many modifications and variations are possible in light of the above teaching. It is intended that the scope of the embodiments be limited not by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats. Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, known to those of ordinary skill in the art of computer programming. Additionally, the techniques are in no way limited to implementation in any specific programming language, or for any specific operating system or environment. Accordingly, the specification is intended to be illustrative, but not limiting, of the scope of the claims, which are set forth below.

What is claimed is:

1. A mobile point-of-sale (POS) terminal for processing a financial transaction between a buyer and a merchant, the mobile POS terminal comprising:
    a mobile computing device running a register application, wherein the register application is configured to receive financial information associated with the buyer from a payment card reader for facilitating a transfer of funds from the buyer to the merchant; and
    the payment card reader coupled with the mobile computing device, the payment card reader comprising:
        a card interface within a card slot, the card interface having projections for contacting an integrated circuit (IC) of an IC payment card, the card slot configured to receive the IC payment card, the card interface configured to receive the financial information associated with the buyer from the IC of the IC payment card using a communication standard; and
        a microprocessor comprising:
            a card interface connection configured to convey one or more communications between the microprocessor and the card interface;
            a general-purpose input/output (GPIO) pin coupled with the card interface connection;
            a non-programmable hardware timer configured to count a first waiting time previously defined by a first implementation of the communication standard;
            a non-programmable logic, coupled with the card interface connection and the non-programmable hardware timer, the non-programmable logic configured to effect the first implementation of the communication standard for communication between the payment card reader and the IC payment card, the non-programmable logic to detect a communication between the IC payment card and the payment card reader;
            an extensible timer; and
            an extensible logic, coupled with the GPIO pin and the extensible timer and the non-programmable hardware timer, the extensible logic to effect a second implementation of the communication standard for communication between the payment card reader and the IC payment card by extending wherein the first waiting time to a second waiting time in response to detection that the non-programmable hardware timer has finished counting the first waiting time, the second waiting time previously defined by the second implementation of the communication standard.

2. The mobile POS terminal of claim 1, wherein the first implementation of the communication standard is a hardware implementation of an International Organization for Standardization (ISO) 7816 standard, and the second implementation of the communication standard is a Europay, MasterCard, and Visa (EMV) standard.

3. A payment card reader comprising:
a microprocessor of the payment card reader;
a card interface connection configured to convey one or more communications between the microprocessor and a card interface of the payment card reader, the card interface to receive financial information from a payment card using a communication standard;
a general-purpose input/output (GPIO) pin of the microprocessor, the GPIO pin coupled with the card interface connection;
a non-programmable hardware timer of the microprocessor, the non-programmable hardware timer configured to count a first length of time that is previously defined by a first implementation of the communication standard;
a non-programmable logic of the microprocessor that is coupled with the card interface connection and the non-programmable hardware timer, wherein the non-programmable logic is configured to effect the first implementation of the communication standard for communication between the microprocessor and the IC payment card using the non-programmable hardware timer;
an extensible timer of the microprocessor; and
an extensible logic of the microprocessor that is coupled with the GPIO pin and the extensible timer and the non-programmable hardware timer, wherein the extensible logic is configured to effect a second implementation of the communication standard for communication between the microprocessor and the IC payment card by extending the first length of time to a second length of time in response to detection that the non-programmable hardware timer has finished counting the first length of time.

4. The payment card reader of claim 3, wherein the first implementation of the communication standard is a hardware implementation of an International Organization for Standardization (ISO) 7816 standard, and the second implementation of the communication standard is a Europay, MasterCard, and Visa (EMV) standard.

5. The payment card reader of claim 3, wherein to the second length of time is previously defined by the second implementation of the communication standard.

6. The payment card reader of claim 3, wherein the non-programmable logic is configured to:
detect transmission of a first character of data; and
start the non-programmable hardware timer in response to detecting transmission of the first character of the data, the non-programmable hardware timer configured to run the first length of time within which a second character of the data should be detected.

7. The payment card reader of claim 3, wherein the extensible logic detects that the non-programmable hardware timer has finished counting the first length of time by detecting an interrupt output by the non-programmable hardware timer.

8. The payment card reader of claim 6, wherein the microprocessor is configured to:
detect that the second character of the data has not been transmitted within the second length of time; and
send a time-out error signal to the card interface of the payment card reader via the card interface connection.

9. The payment card reader of claim 6, wherein the microprocessor is configured to:
detect transmission of the second character of the data within the second length of time; and
intercept a time-out error signal, thereby cancelling transmission of the time-out error signal time.

10. The payment card reader of claim 7, wherein the first length of time and the second length of time are each one of: a work waiting time (WWT), a character waiting time (CWT), or a block waiting time (BWT).

11. A computer-implemented method comprising:
detecting, by a payment card reader, a first bit of a first character of data transmitted between a card interface of the payment card reader and an integrated circuit (IC) of a payment card;
starting a first timer of the payment card reader in response to detecting the first bit of the first character of the data, the first timer configured to run a first length of time within which a first bit of a second character of the data should be detected, wherein the first length of time is previously defined by a first implementation of a communication standard for communication between the card interface of the payment card reader and the IC of the payment card;
detecting, by the payment card reader, that the first timer has expired; and
starting a second timer of the payment card reader in response to detection of the first timer expiring, the second timer configured to run a second length of time within which the first bit of the second character of the data should be detected, wherein a sum of the first length of time and the second length of time is previously defined by a second implementation of the communication standard for communication between the card interface of the payment card reader and the IC of the payment card.

12. The method of claim 11, further comprising:
detecting, by the payment card reader, that the first bit of the second character of the data has not been transmitted between the card interface of the payment card reader and the IC of the payment card within the second length of time; and
sending a time-out error signal to the card interface of the payment card reader in response to detecting that the first bit of the second character of the data has not been transmitted within the second length of time.

13. The method of claim 11, further comprising:
detecting, by the payment card reader, that the first bit of the second character of the data has been transmitted between the card interface of the payment card reader and the IC of the payment card within the second length of time; and
intercepting a time-out error signal within the payment card reader, thereby cancelling transmission of the time-out error signal to the card interface of the payment card reader.

14. The method of claim 11, further comprising:
detecting, by the payment card reader, that the first bit of the second character of the data has been transmitted between the card interface of the payment card reader and the IC of the payment card within the second length of time; and
setting a valid communication flag within the payment card reader in response to detecting that the first bit of the second character of the data has been transmitted between the payment card reader and the IC of the payment card within the second length of time.

15. The method of claim 11, wherein the first implementation of the communication standard is a hardware implementation of an International Organization for Standardization (ISO) 7816 standard, and the second implementation of the communication standard is a Europay, MasterCard, and Visa (EMV) standard.

16. The method of claim 11, further comprising:
receiving a setup transmission from the IC of the payment card at the payment card reader, the setup transmission including transmission protocol parameters; and
calculating the first length of time and the second length of time using the transmission protocol parameters.

17. The method of claim 11, wherein the first length of time and the second length of time are each one of: a work waiting time (WWT), a character waiting time (CWT), or a block waiting time (BWT).

18. A system comprising:
a card interface configured to convey one or more communications between a microprocessor and an integrated circuit (IC) of a payment card;
a hardware timer of the microprocessor, the hardware timer configured to start when a first bit of a first character of data transmitted between the card interface and the IC of the payment card is detected, wherein the hardware timer is configured to run a first length of time within which a first bit of a second character of the data should be detected, wherein the first length of time is previously defined by a first implementation of a communication standard for communication between the card interface and the IC of the payment card;
a timer end detection module of the microprocessor, the timer end detection module configured to detect that the hardware timer has finished counting the first length of time; and
an extensible timer of the microprocessor, the extensible timer configured to, in response to the timer end detection module detecting that the hardware timer has finished counting the first length of time, extend the first length of time to a second length of time within which the first bit of the second character of the data should be detected, wherein the second length of time is previously defined by a second implementation of the communication standard for communication between the card interface and the IC of the payment card.

19. The system of claim 18, further comprising:
the microprocessor, wherein the microprocessor is configured to:
detect that the first bit of the second character of the data has not been transmitted between the card interface and the IC of the payment card within the second length of time; and
send a time-out error signal from the microprocessor to the card interface in response to detecting that the first bit of the second character of the data has not been transmitted within the second length of time.

20. The system of claim 18, further comprising:
the microprocessor, wherein the microprocessor is configured to:
detect that the first bit of the second character of the data has been transmitted between the card interface and the IC of the payment card within the second length of time, and
intercept a time-out error signal within the microprocessor, thereby cancelling transmission of the time-out error signal from the microprocessor to the card interface.

21. The system of claim 18, further comprising:
a non-programmable logic of the microprocessor, the non-programmable logic configured to receive a setup transmission from the IC of the payment card, the setup transmission including transmission protocol parameters, the non-programmable logic configured to calculate the first length of time using the transmission protocol parameters.

22. The system of claim 18, further comprising:
an extensible logic of the microprocessor, the extensible logic configured to receive a setup transmission from the IC of the payment card, the setup transmission including transmission protocol parameters, the extensible logic configured to calculate the second length of time using the transmission protocol parameters.

23. The system of claim 18, wherein the first implementation of the communication standard is a hardware implementation of an International Organization for Standardization (ISO) 7816 standard, and the second implementation of the communication standard is a Europay, MasterCard, and Visa (EMV) standard.

24. The system of claim 18, wherein the first length of time and the second length of time are each one of: a work waiting time (WWT), a character waiting time (CWT), or a block waiting time (BWT).

* * * * *